No. 11,795. Reissued Dec. 12, 1899.

W. H. PERRIN.

SULKY PLOW.

(Application filed July 28, 1899.)

Witnesses:

Horace G. Deitz

W. Harrison

William Humphrey Perrin, Inventor,

By Marion & Marion his Attorneys

THE NORRIS PETERS CO., PHOTO-LITHO., WASHINGTON, D. C.

UNITED STATES PATENT OFFICE.

WILLIAM HUMPHRY PERRIN, OF SMITH'S FALLS, CANADA, ASSIGNOR OF ONE-HALF TO JOHN R. LAVELL, OF SAME PLACE.

SULKY-PLOW.

SPECIFICATION forming part of Reissued Letters Patent No. 11,795, dated December 12, 1899.

Original No. 605,298, dated June 7, 1898. Application for reissue filed July 28, 1899. Serial No. 725,425.

*To all whom it may concern:*

Be it known that I, WILLIAM HUMPHRY PERRIN, a citizen of the Dominion of Canada, residing at Smith's Falls, in the county of Lanark, in the Province of Ontario, Canada, have invented a new and useful Sulky-Plow, of which the following is a specification.

My invention relates to improvements in the manner of raising and lowering the plow and to the manner in which the tongue is secured and to details that will hereinafter be more fully pointed out and claimed.

In the accompanying drawings, forming a part of this specification, similar numerals refer to same and similar parts throughout the several figures.

Figure 1:
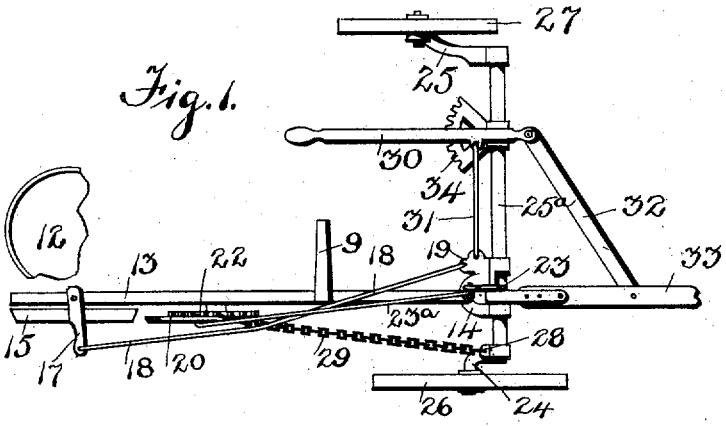
Figure 4:
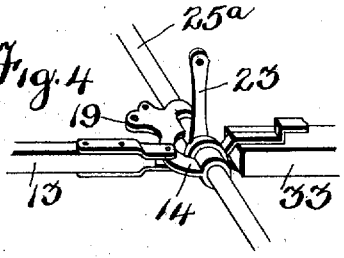
Figure 2:
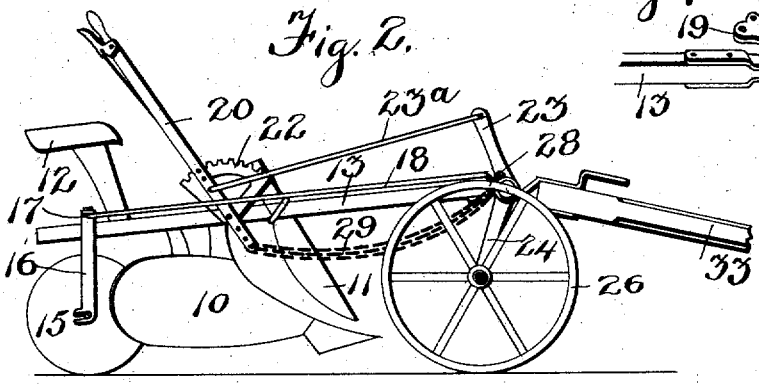
Figure 3:
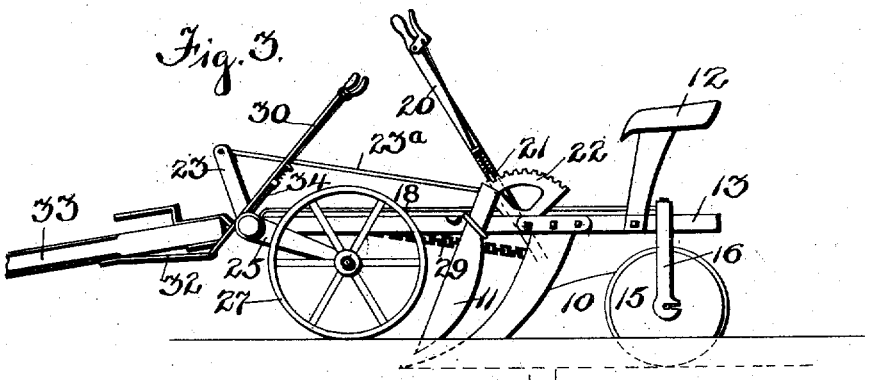

Figure 1 is a top view of my improved plow, the plowshare and colter not being shown. Fig. 2 is a side view of the same, showing the plow raised and the chain slack. Fig. 3 is a view from the other side, showing the plow lowered. Fig. 4 is a detail showing the connection of the plow-beam and axle.

The plow 10, foot-rest 9, colter 11, and seat 12 are of the ordinary construction and are secured to the beam 13 in any suitable manner.

The beam 13 is preferably straight and is secured to the front axle by a yoke 14, which is provided with eyes, through which the said axle passes. The rear end of the beam is supported by a follower-wheel 15. This wheel is journaled in a depending fork 16, which is pivoted to the beam and has an arm 17 formed on its upper end at a right angle to the beam horizontally. This arm is connected by a rod 18 to a lug 19, formed on the yoke 14.

A lever 20 is fulcrumed to the beam, having a spring-catch 21, adapted to engage a toothed segment 22. This lever is connected by a rod $23^a$ to an arm 23, rigidly secured to the front axle. The front axle $25^a$ has arms 24 and 25 at either end rigidly secured. The arm 24 on the furrow side is shorter than the one on the landside side and carries a larger wheel 26, 27 being the landside wheel. A hook 28 is secured to the furrow end of the axle $25^a$ and is connected by a chain 29 to the lower end of the lever 20, which projects below the beam. As shown in Figs. 1 and 4, the yoke 14 is connected to the axle $23^a$ on opposite sides of the arm 23, and while said yoke is mounted to have a limited pivotal movement to allow of the turning of the axle, as hereinafter described, yet this movement is not sufficient to have any tendency to cause the yoke to be moved longitudinally of the axle, the yoke being adapted to remain in a comparatively fixed position. Another lever 30 is fulcrumed on the end of a rod 31, the other end of which is secured to the lug 19 on the yoke 14 and is operated in an approximately horizontal plane. The end of this lever is connected by a rod 32 to the tongue 33. A toothed segment 34 is mounted on the axle $25^a$ near the landside, on which segment the lever 30 is pivotally mounted, as shown in Fig. 1, a spring-catch mounted on the lever 30 engaging with this segment and serving to hold the lever in whatever position it may be set. The tongue 33 is secured to the axle between the two arms of the yoke 14.

As the yoke 14 is held in comparatively fixed position on the axle $25^a$ and the lever 30 is fulcrumed on the end of rod 31, it will be readily seen that when the lever 30 is oscillated on its pivot-point at the end of the rod 31 the segment 34 will have a slight movement longitudinally of the axle $25^a$, this movement being in a direction opposite to that in which the rear end of the lever 30 is moving, this construction serving to cause the lever 30 to move pivotally on both the segment 34 and the end of the rod 31, insuring the contact of the spring-catch with the notches formed in the segment.

The plow is operated in the following manner: When the lever 20 is pulled toward the driver, the axle is turned on its axis, so that the arms carrying the wheels are perpendicular, thus raising the front end of the beam and carrying the plow clear of the ground. The chain 29 is slack, allowing the axle $25^a$ to be turned from its normal position, which is at right angles to the tongue, the turning being on the pivotal connection of the beam to the yoke 14. When, however, the lever is pushed forward or away from the driver, the plow engages the ground and the chain 29 is drawn tight, thus rigidly connecting the plow-beam and axle at a right angle in so far as a movement toward the landside is concerned. It will be readily understood that the axle can be turned in a direction toward the furrow side regardless of whether the chain 29 is slack or tight. When the axle is turned, the rod 18 turns the follower-wheel. When, however, it is necessary for the horses to turn while the plow is in the ground—as, for instance, at the end of a "land"—the lever 30 is disengaged from the toothed segment 34, allowing the tongue to be turned, while the plow continues to go straight on to the end of the land. The depth of the plow in the ground is regulated by the lever 20. It will thus be seen that the construction shown accomplishes two purposes—namely, to regulate the depth to which the plow can enter the ground and prevent the movement of the axle toward the landside while in the ground, and also to hold the tongue normally in a fixed position, but capable of moving in a pivotal manner without disturbing the direction of movement of the plow and its supports.

Having thus described my invention, what I claim as new is—

1. In a sulky-plow, the combination of the axle 25[a] having depending arms at the ends on which the wheels are journaled; an arm 23 secured to said axle; a lever fulcrumed on the plow-beam attached to the said axle; a toothed segment and spring-catch holding said lever in any desired position; a rod connecting said lever to said arm 23, above the fulcrum; and a chain connecting the said lever below the fulcrum with a hook on said axle, substantially as set forth.

2. In a sulky-plow, the combination with the axle 25[a] on the depending arms of which the front wheels are journaled; of the tongue pivotally connected to said axle; the lever 30 fulcrumed on a rod 31; a toothed segment adapted to be engaged by said lever and mounted on said axle; and a brace-rod 32, pivoted to said lever below the fulcrum and to the tongue a short distance from its rear end, substantially as set forth.

3. In a sulky-plow, the combination with the plow-beam; and a supporting-axle therefor, said beam and said axle being pivotally connected; of means for preventing the pivotal movement of said axle on said beam, in one direction, while the plow is in the ground, said axle being free to move when said plow is above the ground.

4. In a sulky-plow, the combination with the plow-beam; and a supporting-axle therefor, said beam and said axle being pivotally connected; of means, connected to said beam and to said axle, for preventing the pivotal movement of said axle on said beam, in one direction, while the plow is in the ground, said axle being free to move when said plow is above the ground.

5. In a sulky-plow, the combination with a wheeled axle, said wheels being concentrically journaled thereto; a plow-beam pivotally connected to said axle; and means for adjustably regulating the distance between said axle and the ground; of means, connected to said axle and to said beam, for preventing the pivotal movement of said axle on said beam in one direction, while the plow is in the ground, said axle being free to move when said plow is above the ground.

6. In a sulky-plow, the combination with the plow-beam, and a supporting-axle therefor, said beam and said axle having a pivotal connection and said axle having an independent rotary movement; means for imparting rotary movement to said axle; and means for locking said axle against pivotal movement in one direction simultaneously with the rotatory movement of said axle in one direction.

7. In a sulky-plow, the combination with the plow-beam, and a supporting-axle therefor, said beam and said axle having a pivotal connection and said axle having an independent rotary movement; of a lever and connections for imparting rotary movement to said axle; and means, connected to said lever and said axle, for locking said axle against movement in one direction when said lever is moved in one direction.

In testimony whereof I have hereunto signed my name in the presence of the two subscribing witnesses.

WILLIAM HUMPHRY PERRIN.

Witnesses:
IDA M. BRECKELS,
NETTIE R. WICKWARE.